United States Patent [19]

Nakata

[11] Patent Number: 4,617,438

[45] Date of Patent: Oct. 14, 1986

[54] APPARATUS WITH AN INFRARED RAY DETECTING TEMPERATURE SENSOR

[75] Inventor: Takeshi Nakata, Shiga, Japan

[73] Assignee: Sanyo Electric Co., Ltd., Osaka, Japan

[21] Appl. No.: 687,387

[22] Filed: Dec. 28, 1984

[30] Foreign Application Priority Data

Jan. 6, 1984 [JP] Japan ......................................... 59-947

[51] Int. Cl.⁴ ............................. H05B 6/68; G01J 1/00
[52] U.S. Cl. ...................... 219/10.55 B; 219/10.55 R; 250/351; 250/347; 350/6.6; 374/121; 374/149
[58] Field of Search ............. 219/10.55 B, 10.55 F, 219/10.55 E, 10.55 R, 492; 250/351, 353, 347, 341, 338 R; 350/6.1, 6.5, 6.6; 374/121, 124, 129, 130, 131, 149; 99/325

[56] References Cited

U.S. PATENT DOCUMENTS

| | | | |
|---|---|---|---|
| 3,811,748 | 5/1974 | Treuthart | 350/6.6 |
| 4,087,690 | 5/1978 | Prober | 250/351 X |
| 4,262,198 | 4/1981 | Gupta et al. | 250/351 X |
| 4,347,418 | 8/1982 | Nobue et al. | 219/10.55 B |
| 4,461,941 | 7/1984 | Fukuda et al. | 219/10.55 B |

FOREIGN PATENT DOCUMENTS

58-32131  2/1983  Japan .

*Primary Examiner*—Philip H. Leung
*Attorney, Agent, or Firm*—Darby & Darby

[57] ABSTRACT

An infrared ray detecting apparatus comprises an infrared ray detecting element (5), bimorph elements (8a and 8b), a transistors (53, 54), a DC-DC converter (55), and a volume (56). A square wave signal is applied to a base of the transistor (53) from a microprocessor (40) included in a microwave oven and a signal having a constant level is applied to a base of the transistor (54). The DC-DC converter (55) is continuously driven in response to an emitter output from the transistor (54) so that a constant voltage $-E_0V$ which is extremely stable is supplied. A voltage $-E_sV$ which is obtained by regulating properly the constant voltage $-E_0V$ by means of the volume (56), is applied to central electrodes of the bimorphs (8a and 8b), while a square wave signal varying between 0 V and $-E_0V$ in response to an on/off state of the transistor (53), is applied to a surface electrodes of the bimorphs (8a and 8b). The square wave signal has a round in its leading edge, due to a time constant comprising resistances of $R_1$, $R_2$, $R_3$, $r_1$, $r_2$ and electrostatic capacity of the bimorphs (8a and 8b).

20 Claims, 12 Drawing Figures

APPARATUS WITH AN INFRARED RAY DETECTING TEMPERATURE SENSOR

BACKGROUND OF THE INVENTION

1. Field of the Invention

The present invention relates to an infrared ray detecting apparatus, and more particularly, relates to an improvement of an infrared ray detecting apparatus for measuring a temperature of an object to be measured by detecting an amount of infrared ray radiated from the object.

2. Description of the Prior Art

An infrared ray detecting apparatus is often used as means, for measuring the temperature of an object to be measured, for converting the amount of infrared rays radiated from the object into a quantity of electricity. And, as is well known in the art, the infrared ray detecting apparatus requires an optical chopper. Namely, the optical chopper makes infrared rays to be measured intermittently incident upon an infrared ray detecting element formed by crystals etc., thereby providing thermal pulses in response to the intensity of the infrared rays. Such infrared ray detecting apparatus is mainly used in a microwave oven for cooking food while detecting the temperature of the food.

In Japanese Patent Laying-Open Gazette No. 97612/1980, there is disclosed a microwave oven to which a conventional infrared ray detecting apparatus is applied. With respect to an optical chopper of the infrared ray detecting apparatus as shown in the same, a disc having recesses such as holes is provided in front of an infrared ray detecting element, to be rotated at a constant speed by a motor. Thus, such structure is not suitable for making the detecting apparatus small-sized.

In Japanese Patent Laying-Open Gazette No. 32131/1983, there is disclosed an optical chopper in a new mode which is directed to make an infrared ray detecting apparatus small-sized. In the structure of this chopper, a shutter is vibrated by bimorph elements which are vibrated by electric signals, for intermittently controlling incident infrared rays. Although the bimorph elements are driven by electric signals in the form of sine waves and square waves in such a device, the bimorph elements are preferably driven by square wave signals in view of simplicity of a circuit for generating such electric signals, signal frequencies with respect to temperatures and stability of the amplitude. However, when the bimorph elements are driven by the square waves, the bimorph elements generate abnormal noises sounding click-clack. Such generation of the abnormal noises is caused by abnormal distortion within the bimorph elements, leading to degradation of the bimorph elements and offensiveness to the ear.

In such a device, mounting accuracy of the aforementioned shutter must be considerably improved for performing accurate infrared ray detection, which is extremely difficult.

When the infrared ray detecting apparatus having such bimorph-driven type chopper is applied to an microwave oven, it is difficult to drive the aforementioned bimorph elements at a constant voltage due to change in power supply voltages caused upon on-off operation of a microwave oscillation circuit.

SUMMARY OF THE INVENTION

Briefly stated, the present invention is directed to an infrared ray detecting apparatus including an infrared ray detecting element, an optical chopper for making an infrared ray to be measured intermittently incident on the infrared ray detecting element, and driving means for driving the optical chopper, the optical chopper having at least one bimorph element and a shutter portion mounted to the bimorph element, the driving means applying to the bimorph a square wave driving signal having a round in the leading edge thereof so that the bimorph is displaced, and the shutter portion performing a chopper action in response to change of the bimorph element.

Preferably, the driving means includes a time constant circuit and the square wave driving signal has a round in the leading edge thereof due to the rise time constant of the time constant circuit.

Accordingly, in accordance with the present invention, no abnormal sound is caused at the time of driving bimorph.

In accordance with another aspect of the present invention, the bimorph element of the infrared ray detecting apparatus in accordance with the present invention comprises first and second electrode terminals and the driving means applies a square wave driving signal to the first electrode terminal of the bimorph element and applies an adjustable reference voltage to the second electrode terminal.

Accordingly, in accordance with the present invention, the reference voltage can be adjusted such that the output of the infrared ray detecting apparatus becomes maximum.

In addition, according to a further aspect of the present invention, the driving means of the infrared ray detecting apparatus in accordance with the present invention comprises a DC-DC converter and a signal for driving the bimorph element is produced from the output of the DC-DC converter. The infrared ray detecting apparatus comprising the DC-DC converter may be preferably mounted in a microwave oven including a microwave oscillating circuit and a microprocessor for controlling the circuit.

Accordingly, in accordance with the present invention, the bimorph element of the infrared ray detecting apparatus can be driven by a constant voltage which is extremely stable.

Therefore, a primary object of the present invention is to provide an infrared ray detecting apparatus which is small-sized, can make an operating sound of bimorph elements quiet and can prevent degradation of the bimorph elements.

A primary advantage of the present invention is that the bimorph element can be driven in response to a square wave signal without causing any abnormal sound.

Another advantage of the present invention is that a precision for attachment of shutter portion can be electrically compensated by regulating reference voltage applied to one electrode of bimorph element.

A further advantage of the present invention is that through a production of a driving signal for bimorph element from a stable output of DC-DC converter, the bimorph element can be driven by a constant voltage in a microwave oven, irrespective of variation of a power supply voltage at the time of on or off state of a microwave oscillating circuit included in a microwave oven and also irrespective of variation in ambient temperature.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1A:
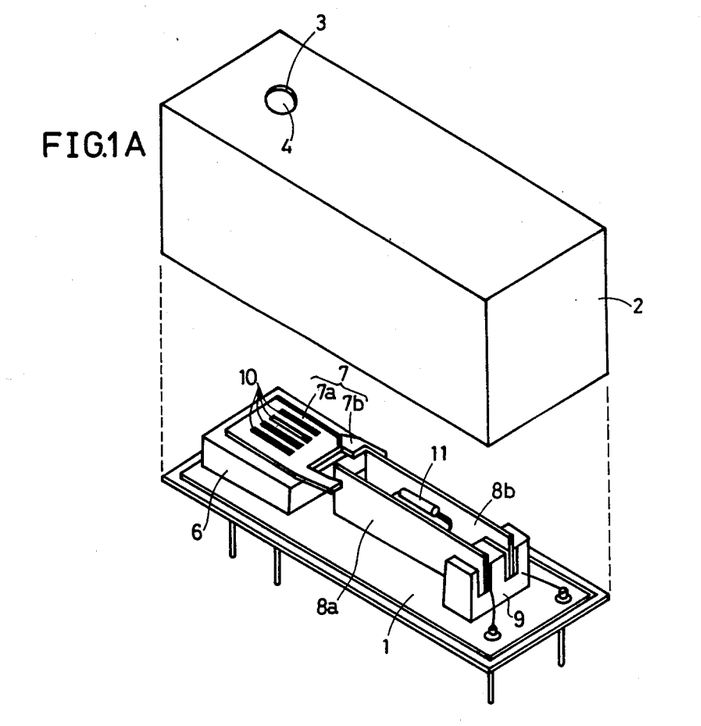
FIG. 1A is an exploded perspective view of an infrared ray detector of an embodiment of the present invention.
Figure 1B:
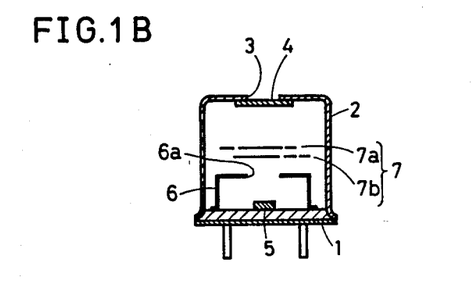
FIG. 1B is a cross-sectional view thereof.

FIG. 1A is an exploded perspective view showing an infrared ray detector of an embodiment of the present invention and FIG. 1B is a cross-sectional view thereof. As shown in FIG. 1A, the enclosure of the detector is structured by a base plate 1 and an outer shielding case 2 engagedly connected to the base plate, so that infrared rays to be measured are incident through a circular window 3 formed in the upper surface of the outer shielding case 2. The circular window 3 is generally covered with a silicon plate 4. As shown in FIG. 1B, on a portion of the base plate 1 immediately under the circular window 3, there is arranged a pyroelectric type infrared ray detecting element 5 made of crystals of lithium tantalate, which is enclosed by an inner shielding case 6. The infrared rays incident through the circular window 3 reach the element 5 through a small hole 6a defined in the upper surface of the inner shielding case 6.

Such a path of incidence of the infrared rays is intermittently shielded by an optical chopper within the case 2. As shown in FIG. 1A, the chopper consists of a shutter portion 7 provided in the vicinity of the small hole 6a of the inner shielding case 6 and first and second bimorph elements 8a and 8b for moving the shutter portion. The first and second bimorph elements 8a and 8b are fixed at the base ends thereof by an insulating supporting member 9 which is attached to the base plate 1, to be opposed in a parallel manner to each other. The shutter portion 7 comprises first and second slit plates 7a and 7b having a plurality of slits 10 and are closely opposed to each other. The first and second slit plates 7a and 7b are respectively fixed to free ends of the first and second bimorph elements 8a and 8b, to be moved in surfaces which are in parallel with each other by displacement of respective bimorph elements.

Figure 2:
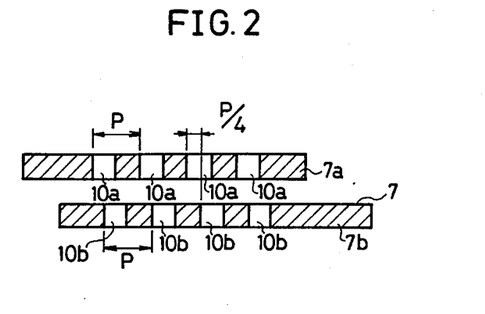
FIG. 2 is a cross-sectional view of an essential part of first and second slit plates of an infrared ray detector of an embodiment of the present invention.

FIG. 2 is a cross sectional view in which the slits of the first slit plate 7a are substantially superposedly aligned with those of the second slit plate 7b. Namely, while all of the respective slits are arranged in the same pitches P, slits 10a of the first slit plate 7a and slits 10b of the second slit plate 7b are displaced by ¼ P from each other in a state the first and second bimorph elements 8a and 8b are not driven. Therefore, when, in FIG. 2, the first slit plate 7a is moved in the right-hand direction and the second slit plate 7b is moved in the left-hand direction respectively by ¼ P, the respective slits 10a and 10b of the first and second slit plates 7a and 7b are completely aligned with each other to fully open the shutter portion 7, while the shutter portion 7 is fully closed by reverse movement of the same by ¼ P respectively.

The shutter portion 7 periodically repeats opening and closing by a driving circuit as hereinafter described, whereby an infrared ray to be measured is intermittently incident on the infrared ray detecting element and the element 5 generates signals corresponding to relative temperature difference between the shutter portion 7 and the object to be measured. In FIG. 1A, a diode 11 provided between the first and second bimorph elements 8a and 8b approximately detects the temperature of the shutter portion 7 utilizing its temperature characteristic. The detected temperature is utilized to calibrate the aforementioned relative temperature difference generated by the element 5.

For performing the aforementioned periodic chopper action in the shutter portion 7, the first and second bimorph elements 8a and 8b must have structure appropriate therefor and must be driven by signal waveforms appropriate therefor.

Figure 3A:
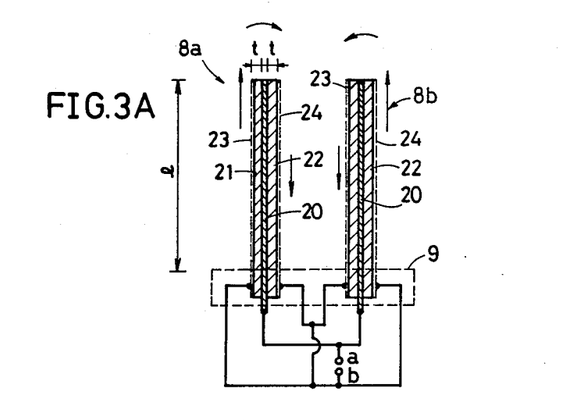
FIG. 3A is a side view of first and second bimorph elements of the infrared ray detector of an embodiment of the present invention and FIG. 3B is a waveform of the driving signal thereof.
Figure 3B:
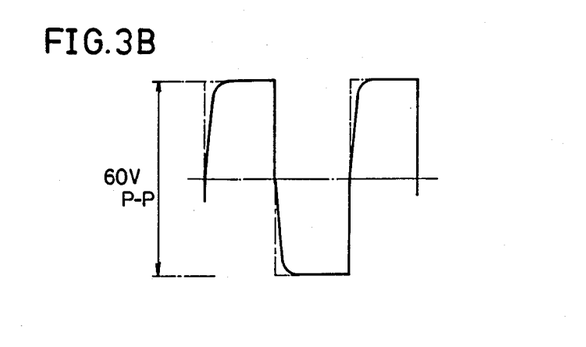

In FIG. 3A, there is shown structure of the first and second bimorph elements 8a and 8b while signal waveforms for driving the same are shown in FIG. 3B. Each of the bimorph elements, which are of the same structure, comprises a central electrode 20 formed by a thin metal supporting plate of Kovar or phosphor bronze and the like, first and second piezoelectric members 21 and 22 of PZT and the like attached to both sides of the central electrode and first and second electrodes 23 and 24 provided in the form of films on the surfaces of the piezoelectric members, and is so polarized that, when a voltage is applied between a terminal a connected to the central electrodes 20 of the first and second bimorph elements 8a and 8b and a terminal b connected to the first and second electrodes 23 and 24, the bimorph elements 8a and 8b are bent in directions opposite to each other.

Assuming that the amount of displacement of the bimorph elements with respect to the applied voltage is represented by y, there is the following relation:

$$y = 3 \cdot \frac{l^2}{(2t)^2} \cdot d_{31} \cdot V$$

in which:
  t: thickness of piezoelectric member
  l: free length
  $d_{31}$: piezoelectric constant
  V: applied voltage Therefore, in order to obtain a large amount of displacement by a bimorph element having a certain piezoelectric constant, it is only necessary to make the free length larger, to make the piezoelectric members thinner or to take the larger applied voltage. If the piezoelectric members are extremely thinned, the mechanical strength is lowered leading to difficulty in manufacture. If the free length is made large, the size of the detector is increased contrary to the contemplation of making the detector small-sized. Thus, the applied voltage is necessarily increased.

Assuming that, in the present embodiment, the free length l of the bimorph element is equal to 1.25 cm, the piezoelectric constant $d_{31}$ is equal to $260 \times 10^{-10}$ cm/V and thickness t of the piezoelectric member is equal to 0.02 cm and the pitch P of each slit of the first and second slit plates $7a$ and $7b$ is equal to 400 μm, and if the free end of each bimorph element must be displaced in an amplitude of 50 μm in one side, i.e., in a total amplitude of 100 μm in both sides for bringing the shutter portion 7 into fully opened and fully closed states as hereinabove described, there is required an applied voltage $V_{P-P}$ having an amplitude of about 130 V.

Figure 4:
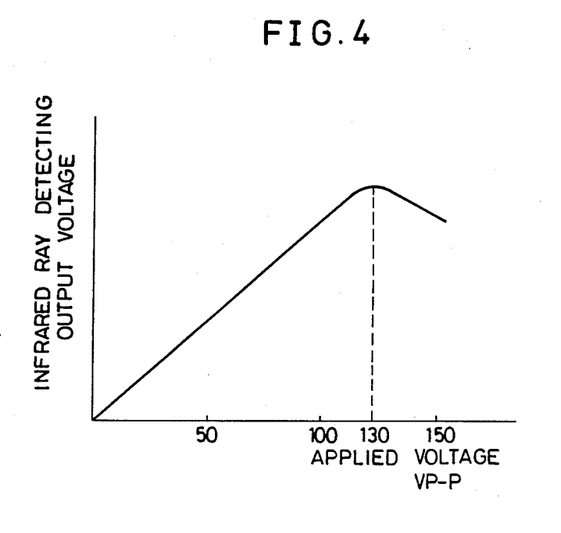
FIG. 4 is a drawing showing characteristic of an infrared ray detecting output of the infrared ray detector of an embodiment of the present invention.

In FIG. 4, there is shown the relation between the applied voltage $V_{P-P}$ and an infrared ray detecting output voltage with respect to a certain amount of incident infrared rays by actually measured values. It is to be noted that the frequency for driving the bimorph element is 3 Hz in this case.

Although it is thus possible to determine the applied voltage $V_{P-P}$ so that the shutter portion 7 is brought into the fully opened and fully closed states, it is preferable to lower the applied voltage $V_{P-P}$ to about 60 V and vibrate respective bimorph elements in a relatively small amplitude in consideration of displacement errors by temperatures of the bimorph elements. Such reason is described in detail with respect to an invention disclosed in Japanese Patent Application No. 218235/1983. Therefore, the applied voltage $V_{P-P}$ is determined to be 60 V also in the present embodiment.

The driving waveforms shown in FIG. 3B are the waveforms of the voltage applied to the terminal b as shown in FIG. 3A in consideration of the above. The terminal a is at a reference potential. As shown in FIG. 3B, the driving waveforms are alternate square waves, and further, according to the present embodiment, respective shoulders of positive and negative rise portions or leading edge portions of the alternate square wave are made round. As a result of employment of such rise waveforms, it is possible to prevent abnormal noises generally caused in the bimorph elements when the same are driven by complete square waves as shown in dotted lines in FIG. 3B. Since excessively long time constant of the aforementioned rise waveforms leads to lowering of infrared ray detecting outputs, it is preferably set to be shorter than the thermal time constant $\tau_t$ of the infrared ray detecting element 5.

Figure 5:
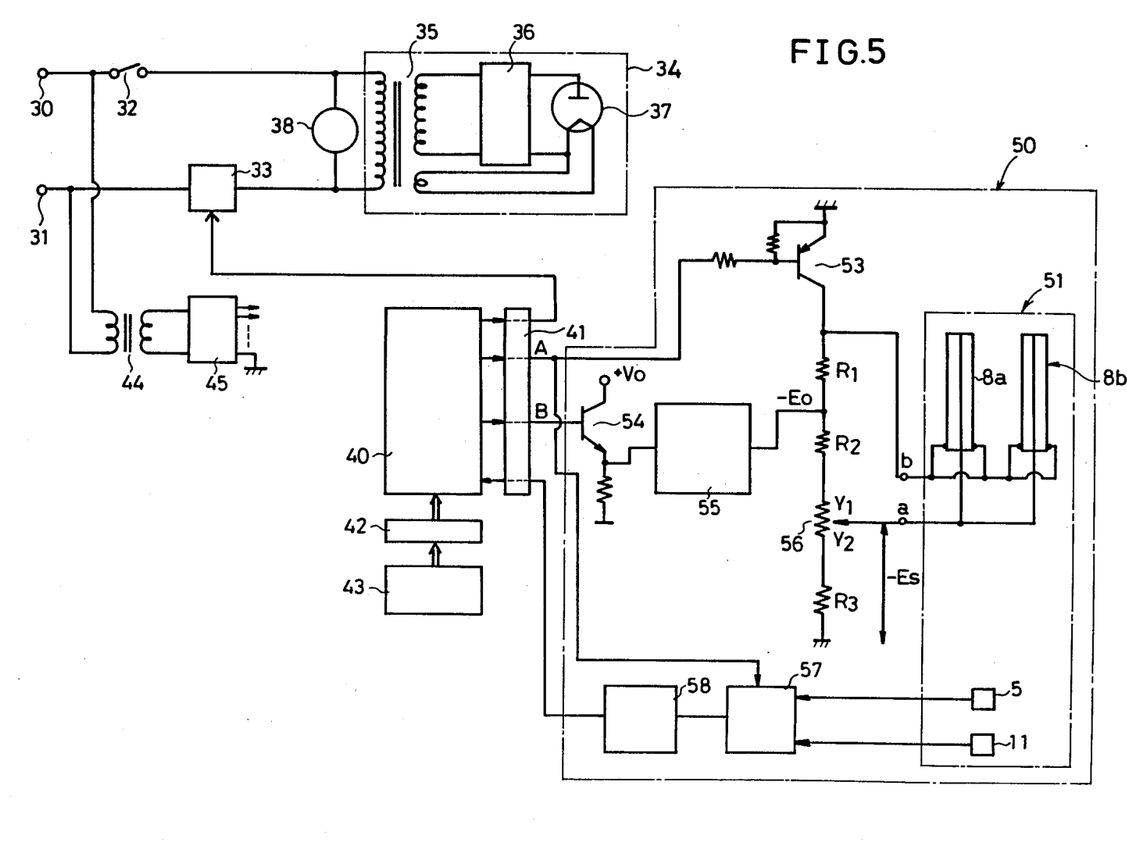
FIG. 5 is a circuit of a microwave oven on which an infrared ray detecting apparatus of an embodiment of the present invention is mounted.

In FIG. 5, there is shown the circuit of a microwave oven into which the above infrared ray detector is assembled. A commercial power source applied to power supply terminals 30 and 31 is supplied through a door switch 32 and a control switch 33 of the microwave oven to a microwave oscillation circuit 34. The microwave oscillation circuit 34 comprises a high-voltage transformer 35, a voltage doubler rectifier 36 and a magnetron 37. The commercial power source is also applied to a cooling fan motor 38 of the magnetron 37.

The control switch 33 includes a bidirectional thyristor, and gate signals thereto are supplied from a microprocessor 40 through an interface 41. The microprocessor 40 performs timer driving operation and temperature driving operation by commands from a keyboard 43 inputted through the interface 42. Namely, in case of timer driving, it turns the control switch 33 on for a period of timer length inputted from the keyboard 43, while, in temperature driving, it operates an infrared ray detecting apparatus 50 to decide the temperature of food by the amount of infrared rays entering an infrared ray detector 51 from the food and turns the control switch 33 on until the same reaches a finishing temperature previously inputted by the keyboard 43.

A DC voltage generator 45 connected to the power supply terminals 30 and 31 through a step-down transformer 14 supplies the microprocessor 40 and the infrared ray detecting apparatus 50 with operating voltage sources therefor respectively.

Figure 6:
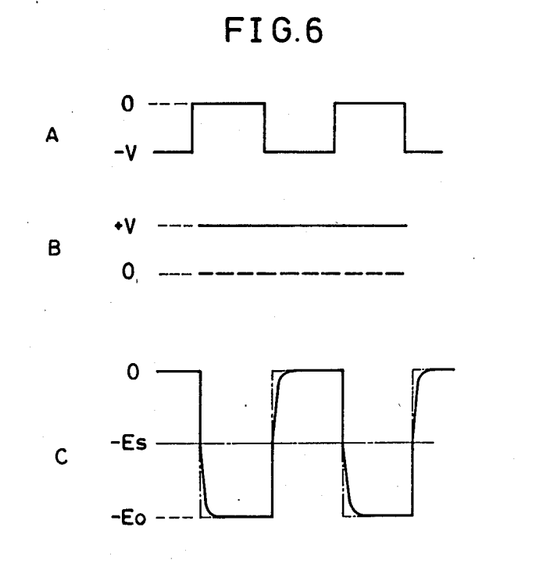
FIG. 6 is a waveform for explaining an operation of the circuit as shown in FIG. 5.

FIG. 6 is a waveform for explaining an operation of the circuit as shown in FIG. 5. Description is now made on structure and operation of the infrared ray detecting apparatus 50. When the detecting apparatus 50 is driven, signals A and B are supplied from the microprocessor 40 through the interface 41. The signal A is a pulse train of 3 Hz as shown in FIG. 6A, whereby a first transistor 53 repeats on-off operation at 3 Hz. The signal B is at a constant level as shown in FIG. 6B, whereby a second transistor 54 is continuously turned on so that a DC-to-DC converter 55 is continuously initiated by emitter outputs thereof. The DC-to-DC converter 55 outputs a DC voltage of $-E0$ V (60 V). Therefore, a constant reference potential of $-Es$ V (about $-30$ V) is applied through a volume 56 to the terminal a of the first and second bimorph elements, while, as shown in FIG. 6C, the terminal b is subjected to application of a voltage of $-E0$ V when the first transistor 53 is off and application of a voltage of 0 V when the same is on, whereby respective bimorph elements are vibrated in a frequency of 3 Hz as hereinabove described.

Figure 7A:
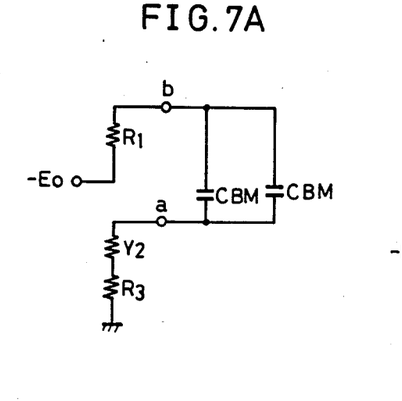
FIGS. 7A and 7B are drawings of equivalent circuits of the circuit shown in FIG. 5.
Figure 7B:
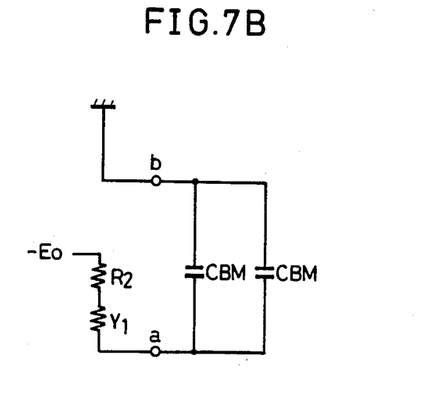

Assuming that the electrostatic capacity of both of the first and second bimorph elements is CBM and that an alternate current manner is considered, there are formed a CR time constant circuit of resistances $R_1$, $r_2$ and $R_3$ and CBM as an equivalent circuit shown in FIG. 7A when the first transistor 53 is off and a CR time constant circuit of resistances $R_2$ and $r_1$ and CBM as an equivalent circuit shown in FIG. 7B when the first transistor 53 is on respectively, whereby respective shoulders of the positive and negative rise portions or leading edge portions of the driving waveforms are made round as shown in FIG. 6C. In the present embodiment, CBM is equal to 10 nF, $R_1$ is equal to 330 Kω, $R_2=R_3$ is equal to 100 Kω and $r_1+r_2$ is equal to 500 Kω, whereby the rise time constant of the aforementioned square waveforms is 5 to 8 msec. The thermal time constant $\tau_t$ of the infrared ray detecting element 5 is 15 to 30 msec.

Figure 8:
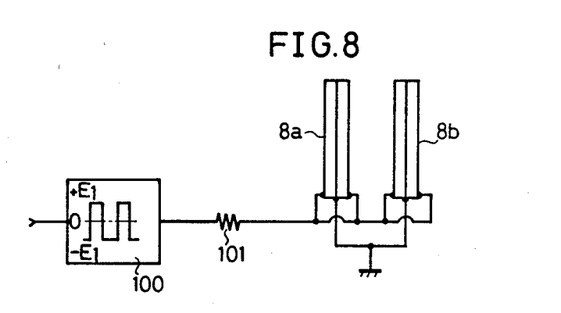
FIG. 8 is a circuit showing a modification of the circuit shown in FIG. 5.

A more simplified example of such waveform driving is shown in FIG. 8. In this case, a square wave pulse train alternating between voltage levels of $-E1$ V and $+E1$ V is outputted from a pulse oscillator 100, to be applied to first and second bimorph elements $8a$ and $8b$ through a resistor 101. Thus, due to the function of a CR time constant circuit formed by the resistor 101 and the electrostatic capacity of each bimorph element, there is obtained a rise driving waveform rounded similarly to the above.

Referring again to FIG. 5, the terminal a is connected to the volume 56, whereby the reference potential of $-Es$ V is adjustable. This means that it is conveniently possible to substantially electrically compensate for displacement in mutual arrangement in assembling of the first and second slit plates 7a and 7b forming the shutter portion 7. With respect to the compensating operation, the volume 56 may be adjusted such that the infrared ray detecting output reaches the maximum, while performing measurement as shown in FIG. 4.

The driving voltage of −E0 V for the bimorph elements must be extremely stable for performing accurate infrared ray detection. When a high-current load such as a magnetron is included as a power supply load as in the present embodiment to be duty-controlled for selection of microwave outputs, change in the power supply voltage is increased. Therefore, the aforementioned driving voltage of −E0 V must be produced from a constant voltage generation circuit. However, a general constant voltage generation circuit for generating a high driving voltage as in the present embodiment has such a disadvantage that the temperature characteristic thereof is not sufficiently stable. Over against this, the DC-to-DC converter 55 is employed in the present embodiment.

Figure 9:
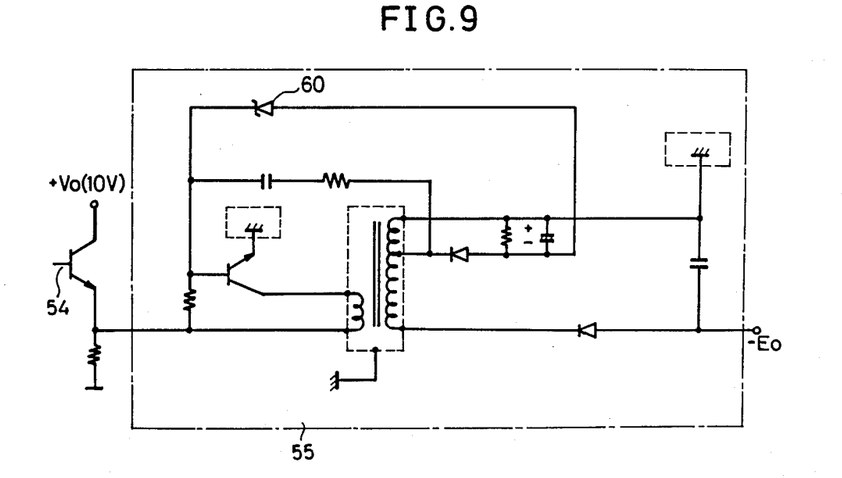
FIG. 9 is a circuit of a DC-DC converter of an infrared ray detecting apparatus of an embodiment of the present invention.

FIG. 9 is a circuit showing in detail a DC-DC converter 55. Since a Zener diode 60 for regulating voltages in the DC-to-DC converter 55 may be selected from Zener-voltage one whose temperature coefficient is substantially equal to zero, the output voltage of −E0 V of the DC-to-DC converter 55 is extremely stable also with respect to the temperature.

Again returning to FIG. 5, outputs from the infrared ray detecting element 5 and the diode 11 enter a processing circuit 57. In this circuit, the output from the element 5 is AC-amplified, passed through a band-pass filter whose central frequency is 3 Hz, thereafter synchronously rectified by the signal A and then DC-amplified to obtain a DC value, which is corrected based on the output from the diode 11 thereby to obtain through an A-D converter 58 a digital amount corresponding to the temperature of the food. The digital amount is inputted in the microprocessor 40 through the interface 41.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. In a microwave oven including a microwave oscillator circuit, and microprocessor means responsive to an output signal from an infrared ray detecting apparatus, for controlling the output power of said microwave oscillator circuit, wherein said infrared ray detecting appparatus comprises:
   an infrared ray detecting element;
   optical chopper means for making an infrared ray to be measured intermittently incident on said infrared ray detecting element, said optical chopper having at least one bimorph element and a shutter portion mounted to said bimorph element, said shutter portion performing a chopper action in response to displacement of said bimorph element;
   driving means including generator means for generating a driving signal having a substantially square wave shape, wave shaping means for forming a rounded leading edge in said driving signal generated by said generator means, for substantially preventing the production of mechanical noise by said bimorph, and coupling means for coupling said driving signal with a rounded leading edge to said bimorph element for driving said optical chopper;
   said generator means of said driving means including a source of direct current voltage, and DC-DC converter means connected to said source of direct current voltage for producing said driving signal; and
   means responsive to an output signal from said infrared ray detecting element, for producing said output signal of said infrared ray detecting apparatus.

2. An infrared ray detecting apparatus comprising:
   an infrared ray detecting element;
   optical chopper means for making an infrared ray to be measured intermittently incident on said infrared ray detecting element, said optical chopper having at least one bimorph element and a shutter portion mounted to said bimorph element, said shutter portion performing a chopper action in response to displacement of said bimorph element; and
   driving means including generator means for generating a driving signal having a substantially square wave shape, wave shaping means for forming a rounded leading edge in said driving signal generated by said generator means, for substantially preventing the production of mechanical noise by siad bimorph, and coupling means for coupling said driving signal with a rounded leading edge to said bimorph element for driving said optical chopper.

3. An infrared ray detecting apparatus in accordance with claim 2, wherein
   said driving signal having a square waveform is generated at a frequency of approximately 3 Hz.

4. An infrared ray detecting apparatus in accordance with claim 2, wherein
   the amplitude of said driving signal in a square waveform is approximately 60 volts.

5. An infrared ray detecting apparatus is accordance with claim 2, wherein
   said infrared ray detecting element is of a pyroelectric type.

6. An infrared ray detecting apparatus in accordance with claim 2, wherein
   said optical chopper means inclusds two bimorph elements arranged in parallel with respect to each other and said shutter portion comprises two slit plates each fixed to free ends if each of said two bimorph elements, each of said two slit plates moving in a plane parallel to each other in response to displacement of each of said bimorph elements.

7. An infrared ray detecting apparatus in accordance with claim 2, wherein
   said wave shaping means includes a time constant circuit.

8. An infrared ray detecting apparatus in accordance with claim 7, wherein
   said time constant circuit comprises an RC time constant circuit.

9. An infrared ray detecting apparatus in accordance with claim 8, wherein
   said CR time constant circuit comprises a resistor and an electrostatic capacitance of said bimorph element.

10. An infrared ray detecting apparatus in accordance with claim 7, wherein the rise time constant of said time constant circuit is smaller than a thermal time constant of said infrared ray detecting element.

11. An infrared ray detecting apparatus in accordance with claim 10, wherein
the rise time constant of said time constant circuit is 5 through 8 m secs and the thermal time constant of said infrared ray detecting element is 15 through 30 m secs.

12. An infrared ray detecting apparatus in accordance with claim 2, wherein said bimorph element includes a first electrode terminal and a second electrode terminal, and
said coupling means comprises means for applying said driving signal to the first electrode terminal of said bimorph element, means for generating an adjustable reference voltage, and means for applying the reference voltage to said second electrode terminal of said bimorph element.

13. An infrared ray detecting apparatus in accordance with claim 12, wherein
said generator means of said driving means comprises a constant voltage generating circuit providing an output of constant voltage, and a switching element coupled to the output of said constant voltage generating circuit for switching the output so that said driving signal is produced.

14. An infrared ray detecting apparatus in accordance with claim 12, wherein
said reference voltage applying means includes a constant voltage generating circuit providing an output of constant voltage, and voltage regulating means coupled to the output of said constant voltage generating circuit for voltage-regulating the output for producing said reference voltage.

15. An infrared ray detecting apparatus in accordance with claim 14, wherein
said voltage regulating means comprises a variable resistor for adjusting said reference voltage.

16. An infrared ray detecting apparatus in accordance with claim 12, wherein
said driving means includes a constant voltage generating circuit having a first constant voltage output and a second constant voltage output,
said generator means of said driving means comprises switching means coupled to the first constant voltage ouput of said constant voltage generating circuit for switching that output for producing said square wave signal, and
said reference voltage applying means comprises voltage regulating means coupled to the second constant voltage output of said constant voltage generating circuit, for voltage-regulating the output for producing said reference voltage.

17. An infrared ray detecting apparatus in accordance with claim 16, wherein
said first constant voltage and said second constant voltage are the same.

18. An infrared ray detecting apparatus in accordance with claim 16, wherein
said voltage regulating means comprises a variable resistor for adjusting said reference voltage.

19. An infrared ray detecting apparatus in accordance with claim 2, wherein
said genetator means of said driving means comprises a direct current voltage generating circuit and a DC-DC converter coupled to said direct current voltage generating circuit, so that said driving signal is produced by utilizing an output of said DC-DC converter.

20. An infrared ray detecting apparatus in accordance with claim 2, wherein
said bimorph element comprises a first electrode terminal and a second electrode terminal, and
said generator means of said driving means comprises a direct current voltage generating circuit for providing a first direct current voltage, a DC-DC converter coupled to said first direct current voltage, means for generating said square wave driving signal by utilizing said second direct current voltage, means for coupling the driving signal to the first electrode of said bimorph element, means for generating a reference voltage using said second direct current voltage, and means for applying the reference voltage to said second electrode of said bimorph element.

* * * * *